Figure 1:
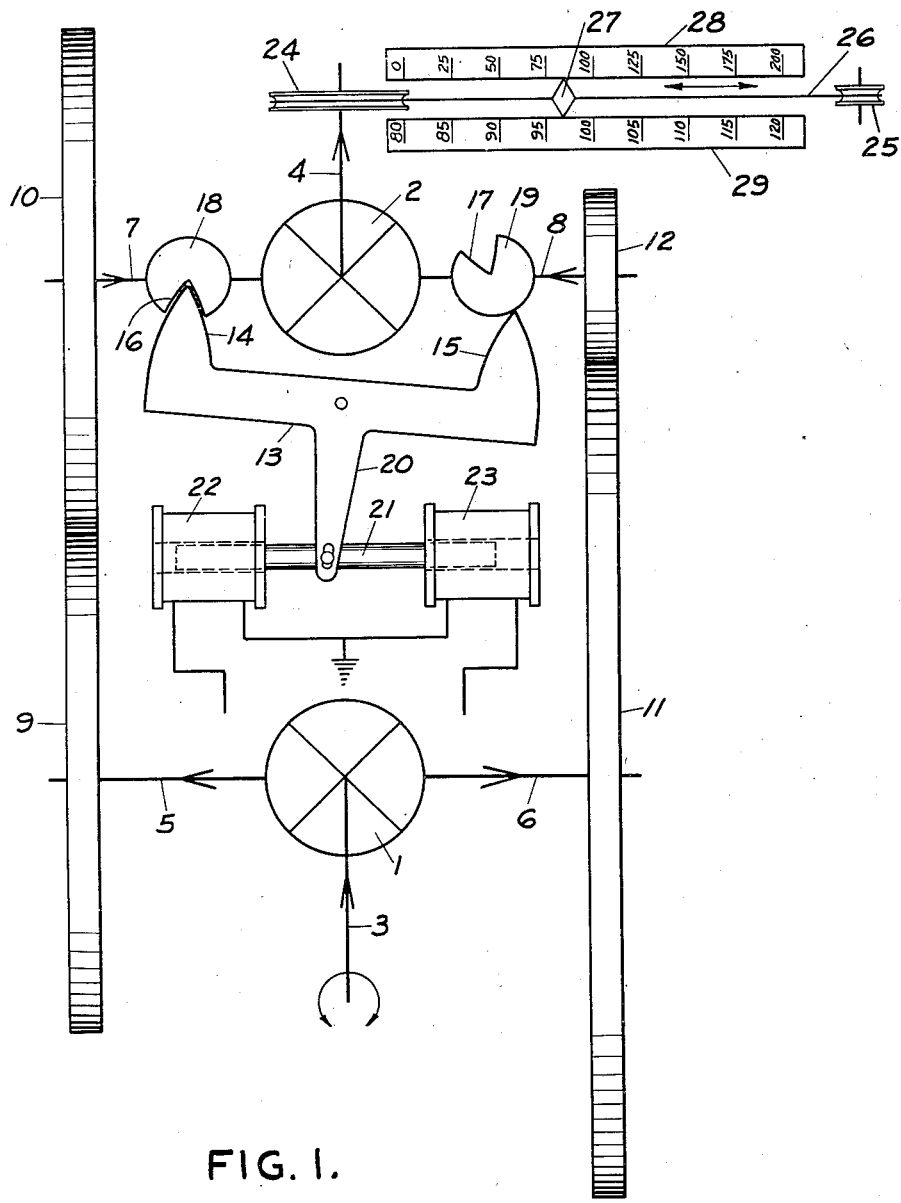

March 1, 1949.    H. L. CLARK    2,462,846
ELECTROMECHANICAL GEAR SYSTEM FOR INDICATORS
Filed Jan. 23, 1945    2 Sheets-Sheet 1

Inventor
HARRY L. CLARK
By
Attorney

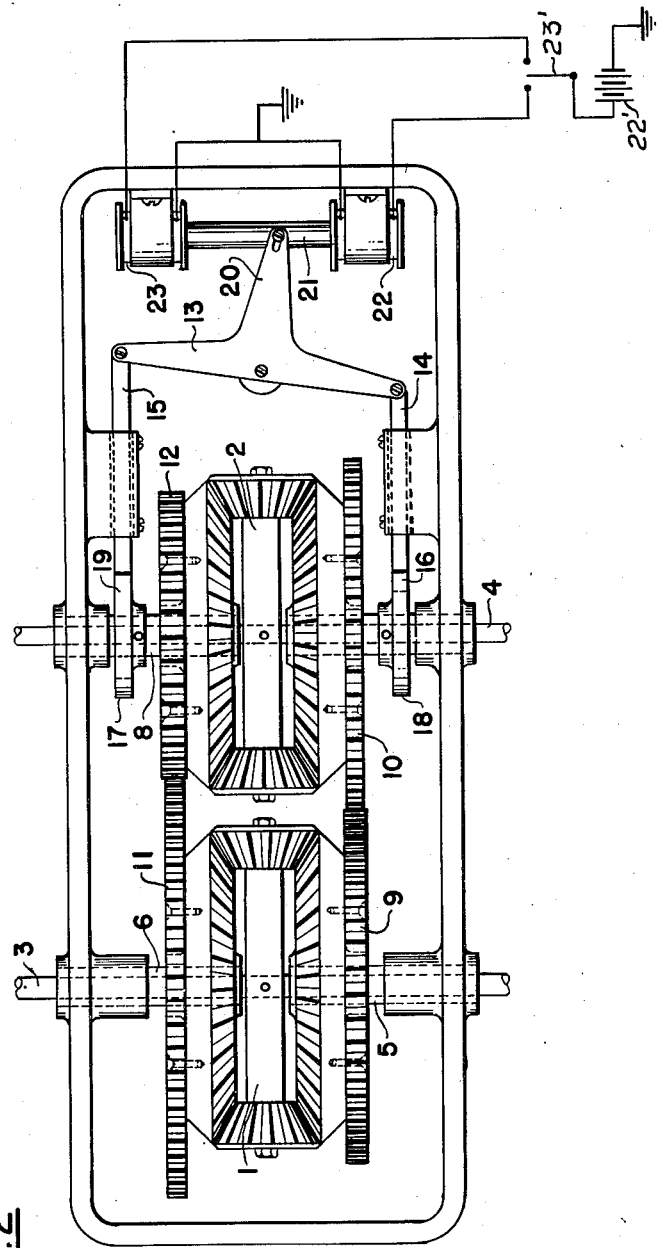

Patented Mar. 1, 1949

2,462,846

UNITED STATES PATENT OFFICE 2,462,846

ELECTROMECHANICAL GEAR SYSTEM FOR INDICATORS

Harry L. Clark, Washington, D. C.

Application January 23, 1945, Serial No. 574,178

4 Claims. (Cl. 177—327)

(Granted under the act of March 3, 1883, as amended April 30, 1928; 370 O. G. 757)

This invention relates to a gear ratio changing device, more particularly to a device for changing the ratio between a driving and a driven shaft without permitting displacement of one relative to the other.

An object of the invention is to provide a gear change unit capable of accurately retaining proper relation of driving and driven shafts in two different ratios. Other objects of the invention will be understood in connection with the description of operation.

Figure 1 of the drawings is a diagrammatic representation of the gear device which is the subject of the present invention.

Figure 2 of the drawings shows one embodiment of my invention.

In Fig. 2 of the drawings, 1 and 2 indicate bevel gear type differentials, however, the invention is not so limited as it includes differentials of all types as schematically indicated by 1 and 2 of Fig. 1. Such differentials are used in many applications, but it is ordinarily considered that the shaft directly connected to the spider element is the output shaft, while the gear shafts are considered input shafts. In the application here described I use differential 2 in its common manner, that is the spider shaft 4 is the output. In the case of differential 1 the spider shaft 3 is driven, and is thus used as the input shaft.

The gear shafts 5 and 6 of differential 1 are geared to the gear shafts 7 and 8 of differential 2, in different ratios. Thus, gears 9 and 10 are of equal size, and gears 11 and 12 are, in this instance, in the ratio of 5 to 1. In operation either pair of gears 9 and 10 or 11 and 12 may be secured immobile, whereupon driving will be by the opposite pair. For example, if gears 11 and 12 be stopped, rotation of shaft 4 will be at the same speed as that of shaft 3, while if gears 9 and 10 be secured, shaft 4 will revolve five times as fast as shaft 3.

To secure one or the other of the gear pairs I have shown a pivoted pawl 13 with teeth 14, 15 cooperating with notches 16, 17 respectively in discs 18, 19. These discs are secured coaxially on the shafts 7 and 8. It will be apparent that pawl 13 may alternately stop rotation of either side of the gear train, and that the position of the pawl determines the speed ratio of shaft 4 relative to shaft 3.

In order to shift pawl 13 as desired, I have shown as an example a solenoid mechanism involving lever arm 20, armature 21 pivoted thereto, and solenoid coils 22, 23 adapted to be selectively energized from any suitable source, such as a battery 22', through any conventional switch, such as a single pole, double throw switch 23'. Depending on which solenoid coil is energized, pawl 13 will be urged to one side or the other. In this manner the gear ratio may be determined by proper position of a switch of any desired form.

The device here described is designed for, and especially suited to, instances in which shaft 3 oscillates, rather than rotates continuously, though not limited to this case in usefulness. Specifically, shaft 4 drives, through gearing not important here, an indicating device. It is desired that full range of the indicating device be utilized with two different amounts of rotation of shaft 3.

To represent this indicator, pulley 24 is secured to shaft 4. A belt 26 operates over pulley 24 and idler 25. Indicator pointer 27 moves along scales 28, 29, one calibrated in 200°, the other in 40°.

To describe the operation, it will be assumed that shaft 3 oscillates through an angle of 200° at one time, and 40° at another, and that it is desired that shaft 4 oscillate through an angle of 200° in either case.

With tooth 15 holding disc 19 fixed, and shaft 3 oscillating through 200°, shafts 5 and 7 and gears 9 and 10 will oscillate through 400°, and shaft 4 through 200°. If now solenoid 22 be energized, tooth 14 of pawl 13 will be urged toward disc 18 and will enter notch 16 when it moves into registry. Shaft 8 will then be released and shaft 7 secured. Assuming that shaft 3 continues to oscillate, but now through an angle of only 40°, shaft 6 oscillates 80°, shaft 8, 400°, and shaft 4, 200°. Since shaft 4 continues to oscillate through the same angle as before, the indicating device continues to move over its full range, though the range now is an expanded indication of 40° operation of shaft 3. That is, a travel of pointer 27 which in the first instance represented 200° on scale 28 now indicates 40° on scale 29, with corresponding increase in possible accuracy of readings.

It will be seen that scales 28 and 29 correspond at only one point, that is at 100°. At all other positions of pointer 27 readings on the two scales would differ. Since each scale is intended to indicate accurately a particular position of shaft 3, the shift from one gear ratio to the other must occur at the point where the true position is indicated on both scales. In the representation this point is 100° and is at the center of the scale, though not necessarily so.

To secure the result it is necessary that discs 18 and 19 be secured in proper position on shafts 7 and 8, and that pawl 13 cooperate with both so that pawl teeth 14 and 15 seat in notches 16 and 17 at the same angular position of shaft 3, in this instance corresponding to 100° on scales 28 and 29. Since in the example given shafts 7 and 8 revolve more than one full revolution, the location of notches 16 and 17 should be chosen with respect to teeth 14 and 15 so that registry will occur only once per oscillation. This same result may be achieved by mounting discs 18, 19 on shafts geared to 7 and 8 in step down ratio, say 2 to 1 or as desired, so that less than a full revolution occurs for the movement of shafts 7 and 8.

The diagrammatic representation is for simplicity only. Any part of the device might take one of numerous forms. Obviously brake discs 18, 19 or equivalent could be in connection with shafts 5, 6. The gearing between the two differentials may be at any two ratios desired. More than two alternative ratios may be had by placing more than one gear unit in tandem. For example, three in tandem will give two cubed, or eight ratios. For special purposes several notches could be cut in either brake disc.

The notched discs are examples of brake devices which will secure a high degree of accuracy in operation. Where such accuracy is not needed other types may be used. The pawl may be replaced by other means for cooperating alternately with the brake discs, one of which may be in connection with a shaft of differential No. 1 and the other with a shaft of differential No. 2. Mechanical rather than electrical means, may be used for operation of the brake device. Idler gears may be used between the differentials. Obviously the indicator could take many forms, or the gear unit be used in operation of other than indicating devices.

The invention described herein may be manufactured and used by or for the Government of the United States of America for governmental purposes without the payment of any royalties thereon or therefor.

I claim:

1. In an indicator having a pointer operable over a pair of scales of unequal calibration, the combination of a rotatable driven shaft engaged with said pointer, a driving shaft, a pair of gear train sets of different ratio in continuous mesh between said shafts, differential means between said sets for selective operation of either set, a rotatable disc in each gear train set, a pawl-engaging notch in each disc, connected pawls alternately engageable in said notches, solenoid means for operating said pawls, and switch means for energizing said solenoid means.

2. The device as defined in claim 1 in which said notches are engageable by said pawls at only one position of said pointer on said scales.

3. The device as defined in claim 1 in which said notches are engageable by said pawls at one position of said pointer substantially centered on said scales.

4. The device as defined in claim 1 in which said scales are linear.

HARRY L. CLARK.

REFERENCES CITED

The following references are of record in the file of this patent:

UNITED STATES PATENTS

| Number | Name | Date |
|---|---|---|
| 1,039,879 | Armstrong | Oct. 1, 1912 |

FOREIGN PATENTS

| Number | Country | Date |
|---|---|---|
| 134,208 | Germany | Oct. 9, 1902 |
| 335,335 | Germany | Mar. 30, 1921 |